April 17, 1945.  J. G. HAWLEY  2,373,679
MASTER CYLINDER
Filed Aug. 19, 1940  3 Sheets-Sheet 2
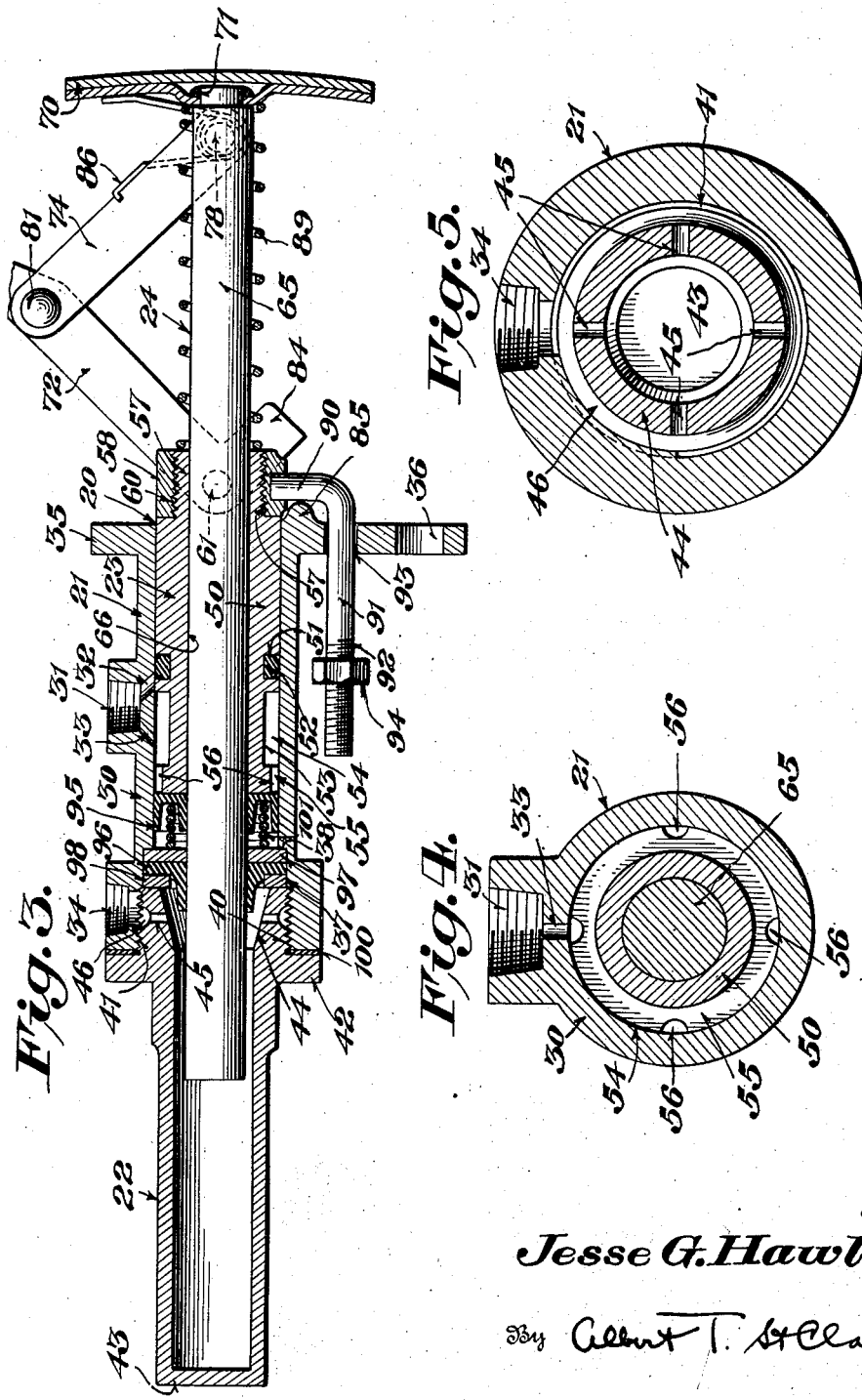
Inventor
Jesse G. Hawley,
By Albert T. St Clair
Attorney April 17, 1945. J. G. HAWLEY 2,373,679
MASTER CYLINDER
Filed Aug. 19, 1940 3 Sheets-Sheet 3
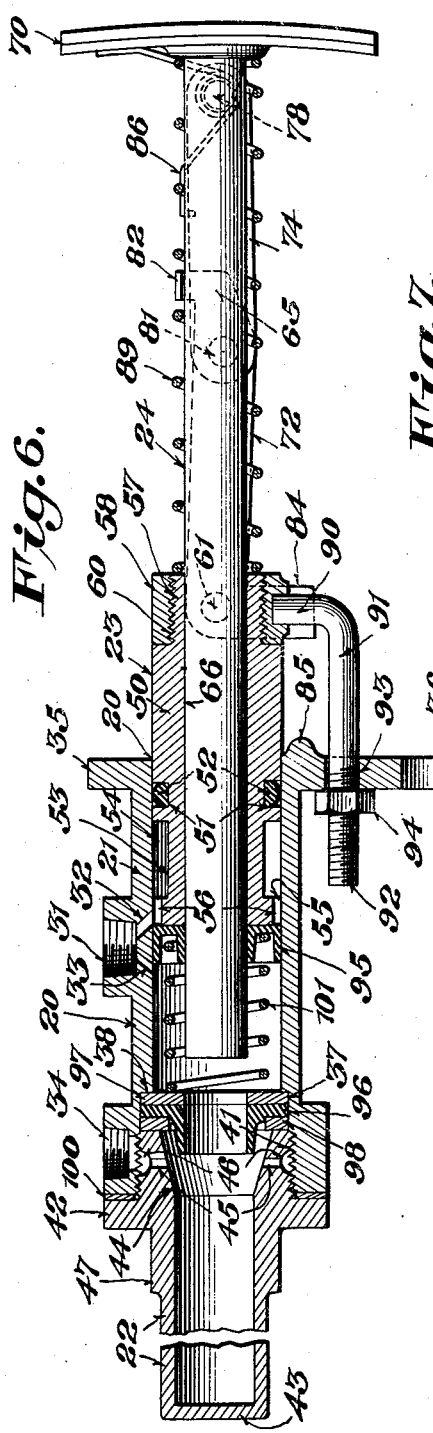
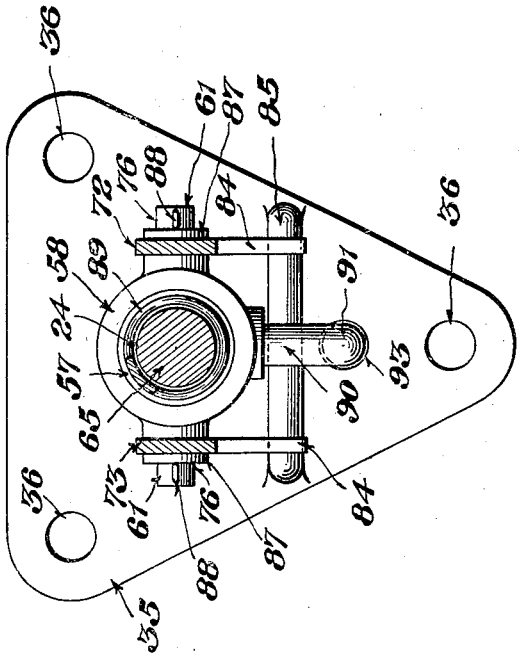
Inventor
Jesse G. Hawley,
By Albert T. St Clair
Attorney Patented Apr. 17, 1945

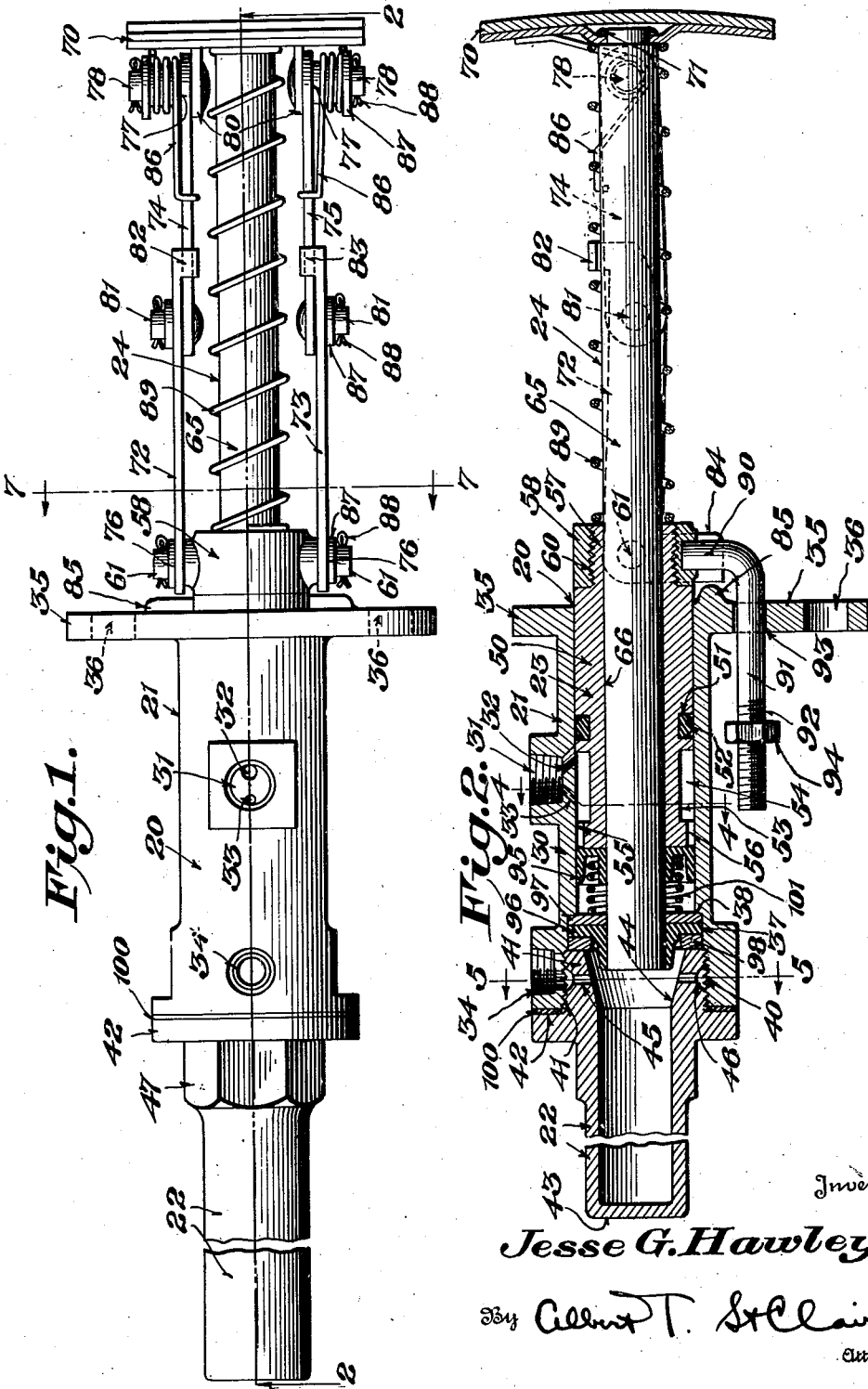

2,373,679

UNITED STATES PATENT OFFICE 2,373,679

MASTER CYLINDER

Jesse G. Hawley, Painted Post, N. Y.

Application August 19, 1940, Serial No. 353,291

4 Claims. (Cl. 60—54.6)

This invention relates to the art of power units, and more particularly to an improved master cylinder.

Numerous master cylinders have previously been developed, but most of these were dependent upon valve mechanisms which were either complicated or capable of failure. In such prior devices, there has also been difficulty in preventing leakage past the piston ring.

I have found that these difficulties can be overcome, and a master cylinder can be produced which is simple in design and efficient in operation, by the construction disclosed herein.

It is therefore an object of this invention to provide a new and improved master cylinder.

It is another object to provide a mechanically operated master cylinder.

It is a further object to provide a master cylinder which is capable of producing any desired hydraulic pressure.

It is an additional object to provide a master cylinder which is free of valve mechanisms.

It is also an object to provide a simple and inexpensive master cylinder of general utility.

With the above and other objects in view, which will be apparent as the description proceeds, I have set forth my invention in the following specification and have illustrated it in the accompanying drawings, in which:

Figure 1 is a plan view of my new master cylinder in partially compressed position;

Fig. 2 is a longitudinal vertical section on the line 2—2 of Fig. 1 with the master cylinder in partially compressed position;

Fig. 3 is a corresponding vertical section, but with the master cylinder in completely compressed position;

Fig. 4 is a vertical transverse section on the line 4—4 of Fig. 2;

Fig. 5 is a vertical transverse section on the line 5—5 of Fig. 2;

Fig. 6 is a longitudinal vertical section corresponding to Fig. 2, but with the master cylinder in completely released position; and Fig. 7 is a vertical transverse section on the line 7—7 of Fig. 1.

Referring to the accompanying drawings, and particularly to Figs. 1 and 2 thereof, my improved master cylinder 20 preferably comprises a low pressure fluid cylinder 21, a high pressure fluid chamber unit 22, a large piston 23, and a small piston assembly 24.

As best shown in Figs. 2, 3, and 6, fluid cylinder 21 comprises a cylindrical housing member 30, open at both ends, and provided with a threaded inlet port 31, which has reversely arranged orifices 32, 33, and a threaded outlet port 34. At its forward end, cylindrical member 30 is provided with a peripheral flange 35 of any desired shape, but here shown as being triangular. It is preferably integral with cylindrical member 30 and provided with a plurality of orifices 36, as best shown in Fig. 7, for convenience in attaching the master cylinder in any suitable location, such as the floor board (not shown) of an automobile.

At its rear end, cylindrical member 30 is provided with a counterbored portion 37 terminating in the shoulder 38 and internally threaded at 40 to receive the corresponding externally threaded end 41 of the fluid chamber unit 22. The latter is provided with a circumferential flange 42 just beyond the threaded end 41, and with a closed end 43. The fluid chamber unit 22 is also provided with a tapered inlet 44 adjacent the threaded end 41, and with a plurality of transverse orifices 45 which extend from the internally tapered inlet 44 through the end 41 and communicate with a circumferential recess 46 therein, as shown in Figs. 2 and 5.

The exterior of chamber unit 22 is provided with an integral circumferential nut 47, adjacent to the flange 42, to facilitate the tightening or loosening of fluid chamber unit 22.

As shown in Fig. 2, large piston 23 comprises a cylindrical block 50 of uniform diameter throughout its operative area, except that it is recessed at 51 to receive a resilient packing ring 52, and cut away at 53 to provide a fluid receiving chamber 54. At its extreme inner end, and formed by the cut away portion 53, piston 23 terminates in a peripheral flange 55, which is provided with a series of recesses 56, as shown in Fig. 4.

At its forward end, the piston block 50 has a threaded portion 57 of reduced diameter to receive a nut 58, which is internally threaded at 60, and is provided with a pair of lugs 61 on opposite sides thereof.

Small piston assembly 24 comprises a cylindrical small piston 65 which is telescoped through an orifice 66 in the cylindrical piston block 50 and is provided, at its opposite end, with an operating head 70, that may be a foot pedal, which is preferably brazed or welded at 71 to the end of small piston 65.

My small piston assembly 24 also comprises a toggle mechanism which forms a substantially rigid connection between the pistons 23 and 65, thus causing them to travel together until the small piston assembly is caused to break or collapse as set forth below.

Two pairs of toggle links 72, 73 and 74, 75 are pivoted, at one end, at 76 and 77, respectively, on the lugs 61 and on pivot pins 78. The latter are mounted in ears 80 carried by the operating head 70. The opposite end of each toggle link is pivotally secured to a pivot pin 81. As shown in Fig. 2, pivot pin 81 is mounted off-center slightly (for example 1/16"), in the direction of an operating angular extension disclosed below, with respect to the line connecting the pivots 76, 77. Toggle links 72, 73 terminate, near the intermediate pivot pins 81, in lateral flanges 82, 83, respectively, and, near their pivots on lugs 61, in right angular extensions 84. The latter are adapted, when the piston rod 65 is pushed forward, to contact a projection 85 on flange 35 and swing links 72, 73 outwardly on lugs 61, as shown in Fig. 3. This causes the intermediate pivot pins 81 to also swing outwardly and carry the inner ends of links 74, 75 with them, thus swinging the outer ends of links 74, 75 on their pivot pins 78, against the pressure of coil springs 86, also carried by the pins 78. As shown, the lateral flanges 82, 83, on toggle links 72, 73, limit the downward travel of the intermediate pivot pins 81 under the influence of coil springs 86. Suitable washers 87 and cotter pins 88 are provided to retain the links 72, 73, 74, 75 on their respective pivots.

A coil spring 89 is telescoped around the small piston 65 and bears against the reduced end 57 of piston block 50 and the operating head 70, tending to keep these parts in the position shown in Figs. 1, 2, and 6.

Nut 58 also carries a guide rod 90, which has a right angular extension 91 that is threaded at 92 and is adapted to pass through an orifice 93 in peripheral flange 35, to prevent the turning of large piston 23 with respect to fluid cylinder 21. A nut 94, threaded on the right angular extension 91 of guide rod 90, is adapted to limit the outward travel of piston 23.

Small piston 65, after passing through large piston 23, passes through a resilient cup washer 95, which acts as a seal for the operating fluid in chamber 54, and thence through a resilient washer 96 that is protected on opposite sides by metal washers 97, 98. This washer assembly is clamped between the inner end 41 of fluid chamber unit 22 and the end of fluid cylinder 21 by the adjustment of chamber unit 22. A washer 100, preferably of copper, is preferably inserted between these members. A coil spring 101, telescoped around piston 65, bears against washer 97 and keeps the cup washer 95 in contact with the inner end of piston block 50, to restrict the passage of fluid thereby.

Inlet port 31 preferably communicates with a fluid reservoir (not shown). Similarly, outlet port 34 communicates with the mechanism (not shown) which it is desired to actuate by the operation of the master cylinder.

With the master cylinder in the position shown in Fig. 6, large piston 23 is withdrawn to the right sufficiently to permit coil spring 101 to force resilient cup washer 95 to uncover orifice 33 and allow fluid from the reservoir (not shown) to enter cylinder 21 and pass through washer assembly 96, 97, 98 into fluid chamber 22. When operating head 70 is depressed, the parts are changed to the position shown in Fig. 2, piston 23 being moved to the left sufficiently to close orifice 33 in inlet port 31 and prevent ingress of further fluid from the fluid reservoir. Small piston 65 has also entered washer assembly 96, 97, 98, and is ready, upon any further movement, to eject fluid from chamber 22. The right angular extensions 84 on toggle links 72, 73 are also ready to contact projection 85. Upon any further movement of operating head 70, coil spring 89 is compressed and the contact of extensions 84 with projection 85 swings toggle links 72, 73 outwardly on pivots 76 and starts the toggle action, as shown in Fig. 3. This also causes piston rod 65 to enter fluid chamber 22 and displace fluid therefrom through orifice 45 into the circumferential recess 46, and thence through outlet port 34 to the mechanism to be actuated thereby.

Upon releasing operating head 70, spring 89 forces it outwardly to the position shown in Fig. 6, toggles 72, 73, 74, 75 are straightened with the aid of springs 86, resilient cup washer 95 is forced against piston block 50 by spring 101, orifice 33 is uncovered, and the resulting reduced pressure created in cylinder 21 draws in fluid from the fluid reservoir (not shown).

The master cylinder may be made of any suitable materials, but if made for aircraft use, it would be of light construction, such as aluminum alloys or magnesium, and, in this event, a thin steel cylinder would be pressed inside the main cylinder to reinforce it.

From the above description, it will be apparent that my improved master cylinder is not only efficient in operation, but that it is simple in construction and may be manufactured inexpensively because it eliminates unnecessary linkage and valves. It is adjustable, by means of nut 94, to vary the volume of fluid supplied, to take up all slack in the brake or other mechanism to be actuated thereby. Furthermore, the fluid is automatically transferred from the large low pressure cylinder to the smaller diameter high pressure chamber, and the resulting apparatus comprises a direct acting master cylinder which will supply the required volume of fluid with a minimum of pedal travel.

The washer assembly 96, 97, 98, in conjunction with the small piston 65, prevents the escape of fluid from the high pressure chamber into the low pressure cylinder while the fluid is being displaced from the former to the mechanism to be actuated by the master cylinder.

A particular use for which my new master cylinder is adapted is for applying automobile brakes, but it is also adapted for applying airplane brakes and, in general, may be used, wherever a power unit is needed for supplying fluid pressure.

As many apparently widely different embodiments of this invention may be made without departing from the spirit thereof, it is to be understood that I do not limit myself to the foregoing embodiments or description except as indicated in the following claims.

I claim:

1. In a master cylinder, the combination of a fluid cylinder, a fluid chamber in communication with the fluid cylinder, a large piston, and a small piston assembly, the latter including a small piston passing through the large piston and being provided with toggle links for normally causing the small piston assembly to move with the large piston, an angular extension on one of the toggle links and a rib carried by the fluid cylinder to collapse the toggle links at a predetermined point in the travel of the small piston and permit the latter to be advanced through the large piston and into the fluid chamber to cut off communication between the fluid cylinder and the fluid chamber and displace fluid from the latter.

2. In a master cylinder, the combination of a fluid cylinder, a fluid chamber in communication with the fluid cylinder, a large piston, and a small piston assembly, the latter including a small piston passing through the large piston and being provided with toggle links for normally causing the small piston assembly to move with the large piston, an angular extension on one of the toggle links and a rib carried by the fluid cylinder to collapse the toggle links at a predetermined point in the travel of the small piston and permit the latter to be advanced through the large piston and into the fluid chamber to cut off communication between the fluid cylinder and the fluid chamber and displace fluid from the latter, and an additional means for limiting the outward movement of the small piston.

3. In a master cylinder, the combination of a fluid cylinder, a fluid chamber in communication with the fluid cylinder, a large piston, and a small piston assembly, the latter including a small piston passing through the large piston and toggle links and means for normally maintaining them in a position substantially parallel to that of the small piston, and a stop interposed in the path of the toggle links for displacing them from their normal position at a predetermined point in the travel of the small piston to permit the latter to be advanced through the large piston and into the fluid chamber to cut off communication between the fluid cylinder and the fluid chamber and displace fluid from the latter.

4. The master cylinder of claim 3, in which the fluid cylinder is provided with an inlet port and the large piston comprises a piston block provided with a circumferential recess, a resilient packing ring at one side thereof, and a terminal flange at the opposite side thereof recessed around its periphery, a resilient washer, a spring for maintaining the washer in contact with the end of the piston block and adapted, upon the outward movement of the small piston, to uncover the inlet port and permit fluid to enter the fluid cylinder in advance of the resilient washer, a perforate washer interposed between the fluid cylinder and the fluid chamber and adapted to provide communication between these members when the small piston is withdrawn to the right, but to prevent further passage of fluid from the fluid cylinder to the fluid chamber when the piston is in its intermediate position, and to expel fluid from the fluid chamber to the exterior thereof when the small piston passes through the perforate washer.

JESSE G. HAWLEY.